United States Patent
Ohleier et al.

(10) Patent No.: US 7,318,860 B2
(45) Date of Patent: Jan. 15, 2008

(54) GREEN PIGMENT PREPARATIONS

(75) Inventors: Heinfred Ohleier, Kelsterbach (DE); Joachim Weber, Reinach (CH); Olaf Schupp, Grenzach (CH)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 10/577,590

(22) PCT Filed: Oct. 30, 2004

(86) PCT No.: PCT/EP2004/012326

§ 371 (c)(1),
(2), (4) Date: Apr. 27, 2006

(87) PCT Pub. No.: WO2005/044925

PCT Pub. Date: May 19, 2005

(65) Prior Publication Data

US 2007/0068420 A1    Mar. 29, 2007

(30) Foreign Application Priority Data

Nov. 5, 2003    (DE) ................. 103 51 580

(51) Int. Cl.
| | |
|---|---|
| *C09B 67/22* | (2006.01) |
| *C09B 67/00* | (2006.01) |
| *C09B 67/20* | (2006.01) |
| *C08J 3/20* | (2006.01) |
| *C08K 5/00* | (2006.01) |
| *C09D 7/12* | (2006.01) |
| *C09D 11/00* | (2006.01) |
| *C09D 11/02* | (2006.01) |
| *C09D 17/00* | (2006.01) |
| *G02B 5/20* | (2006.01) |
| *G02B 5/22* | (2006.01) |

(52) U.S. Cl. ............ 106/413; 106/31.78; 106/410; 106/411; 106/493; 106/494; 106/496; 106/499; 47/57.6; 162/162; 430/7; 430/108.21; 524/88

(58) Field of Classification Search ............ 106/410, 106/411, 413, 493, 499, 31.78, 494, 496; 47/57.6; 162/162; 430/7, 108.21; 524/88
See application file for complete search history.

(56) References Cited

U.S. PATENT DOCUMENTS

| | | | |
|---|---|---|---|
| 6,482,817 B1 | 11/2002 | Kaul et al. | |
| 2007/0027239 A1* | 2/2007 | Weber et al. | 524/190 |

FOREIGN PATENT DOCUMENTS

| | | |
|---|---|---|
| CS | 277656 | 8/1992 |
| DE | 3623335 | 1/1988 |
| JP | 59147039 | 8/1984 |
| JP | 2000 063699 | 2/2000 |
| JP | 2003-232914 A * | 8/2003 |

OTHER PUBLICATIONS

PCT Search Report for PCT/EP 2004/012326, Jan. 31, 2005.
English Abstract of JP 2002201347, Jul. 19, 2002.
English Abstract of JP 63046472, Feb. 27, 1998.
English Abstract of JP 62280779, Dec. 5, 1987.
English Abstract of JP 62054275, Mar. 9, 1987.
English translation of PCT IPER for PCT/EP2004/012326, mailed Sep. 28, 2006.

* cited by examiner

*Primary Examiner*—Anthony J. Green
(74) *Attorney, Agent, or Firm*—Anthony A. Bisulca

(57) ABSTRACT

A green pigment preparation that is characterized by a C.I. Pigment Yellow 214 and at least one copper phthalocyanine pigment C.I. Pigment Blue 15:3 and/or C.I. Pigment Blue 15:1 content, the ratio of C.I. Pigment Yellow 214 to the at least one copper phthalocyanine pigment being in the range from 1:20 to 20:1. The inventive pigment preparation are especially suitable for the low-warpage colouring of semi-crystalline plastics with pure green tones.

12 Claims, No Drawings

GREEN PIGMENT PREPARATIONS

The present invention relates to pigment formulations comprising a blue copper phthalocyanine pigment and a yellow pigment, to processes for their production and to their use for pigmentation of macromolecular organic materials, particularly of plastics, especially for low-warpage pigmentation of partly crystalline plastics, for example polyolefins, with clean green hues.

The coloration of partly crystalline plastics with organic pigments frequently gives rise to warpage phenomena due to effects on crystallite formation in the material. The pigmentation of large-volume injection moldings, especially those composed of polyethylene, frequently leads to deformation, shrinkage and cracking (due to internal stresses, so-called stress crack formations), rendering the colored articles unusable, depending on the field of application. Bottle crates, for example, are likely to become unstackable through loss of shape and closures, inaccurate in fit.

These disadvantages relate to the majority of organic pigments, whereas inorganic pigments and a minority of organic pigments behave relatively neutrally. It is believed that pigments act as nucleation sites during the solidification of the polymer melt and thus lead to a polymer which is prone to warp.

As well as the addressed shape stability on the part of the colored injection moldings, the colorations shall possess good performance characteristics, such as heat stability, light fastness and migration fastness. The dispersibility of the pigments used for producing the pigment formulations has to be very good in order that colorations having the desired high color strength may be obtained. Particularly the cleanness of hue is expected to meet high requirements.

Various proposals have already been made for achieving green hues for plastics coloration by mixing of blue and yellow pigments:

JP 59-147 039 discloses a mixture of copper phthalocyanine with chrome yellow pigments whereby PVC can be colored in moss green hues. The use of chromium-containing pigments is avoided these days because of the associated environmental problems. The proposed mixtures are unsuitable for clean greens. Nothing is said regarding warpage or even ameliorated warpage.

DE-A-36 23 335 discloses green mixed-crystal pigments of yellow quinacridone quinones with blue indigo. However, they exhibit defective fastnesses to light and weathering, which are only improved through the use of a third component. It is also stated that a "strong green color" is only obtained through the production of a mixed crystal; the mechanical mixture has a dirty brown hue. Moreover, there is a need for an additional operation, which creates additional costs. The present process generates large amounts of dilute sulfuric acid which have to be disposed of. Nothing is said regarding warpage or even ameliorated warpage.

CS-A-277 656 discloses a process for producing green mixed pigments by precipitation of soluble precursors of yellow pigments onto copper phthalocyanine pigments.

JP 2000-063699 discloses specific mixtures of copper phthalocyanine pigments and azo pigments that are notable for the absence of chlorine. Particular performance characteristics or even advantages in the coloration of plastics were not found.

Typically, as also described in CS-A-277 656, the mixing of a blue pigment with a yellow pigment creates hues whose cleanness and saturation (chroma) is below that of the individual components.

Similarly, the use of the known P.Y. 180 in combination with a blue pigment does not meet present-day requirements, since, although low-warpage and thermally stable colorations are obtained, the cleanness of the hue is unsatisfactory.

It is an object of the present invention to provide pigment formulations for the coloration of macromolecular materials, especially for the low-warpage coloration of partly crystalline plastics with clean green hues.

We have found that this object is achieved, surprisingly, by using pigment formulations comprising a blue copper phthalocyanine pigment and C.I. Pigment Yellow 214.

The present invention accordingly provides a pigment formulation comprising preferably 1% to 40% by weight of C.I. Pigment Yellow 214 and preferably 1% to 40% by weight of the copper phthalocyanine pigment C.I. Pigment Blue 15:3 and/or C.I. Pigment Blue 15:1, the ratio of C.I. Pigment Yellow 214 to copper phthalocyanine pigment being in the range from 1:20 to 20:1, preferably in the range from 1:10 to 10:1 and especially in the range from 1:5 to 5:1.

Preferred pigment formulations for the purposes of the present invention comprise a) 1% to 40% by weight, preferably 2.5% to 40% by weight and more preferably 5% to 40% by weight of C.I. Pigment Yellow 214, b) 1% to 40% by weight, preferably 2.5% to 40% by weight and more preferably 5% to 40% by weight of C.I. Pigment Blue 15:3 and/or 15:1, c) 20% to 98% by weight, preferably 20% to 95% by weight and more preferably 20% to 90% by weight of polyolefins, preferably polypropylenes and polyethylenes, such as commercially available LLDPE, HDPE, LDPE or polyolefin waxes, d) 0% to 40% by weight and preferably 0.1% to 25% by weight of additives customary in master batch production, e) 0% to 25% by weight and preferably 1% to 20% by weight of one or more white pigments, for example titanium dioxide, the fractions of all components a) to e) being based on the total weight of the pigment formulation (100% by weight), and also f) 0% to 40% by weight and preferably 1% to 20% by weight, based on the sum total of the weights of the components a) and b), of one or more shading colorants, for example carbon black, chromium titanate, nickel titanate or bismuth vanadate.

The additives customary in master batch production are for example stabilizers, such as UV absorbers or antioxidants, optical brighteners, fillers, antistats, lubricants and dispersing assistants.

The pigment formulations of the present invention can be produced by the customary known processes for producing a master batch. For example, the pigments a) and b) are incorporated homogeneously into the component c) separately, if appropriate with the components d), e) and f), as a dry mixture or as a mixture of two pigment formulations. For example, the two pigments or the pigment mixture are incipiently sintered with a commercially available polyolefin and/or a polyolefin wax in a hot cold mixer before the mixture is extruded; in the second case, when there are already two pigment formulations in existence, it is sufficient to coextrude the two formulations.

The pigment formulations of the present invention are very useful for low-warpage coloration of partly crystalline plastics with particularly clean green hues. The present invention accordingly further provides for the use of the pigment formulations of the present invention for the low-warpage pigmentation of partly crystalline plastics with particularly clean green hues.

As used herein, the term "low-warpage" is to be understood as meaning a degree of warpage which is distinctly reduced compared with a pigment formulation which is not in accordance with the present invention.

Partly crystalline plastics is to be understood as referring to those which solidify to form small crystalline nuclei or aggregates, including those which do so only in the presence of nucleating agents (organic pigments for example). Partly crystalline plastics are generally thermoplastic macromolecular organic materials having a molecular weight ($M_w$) in the range from $10^4$ to $10^8$ g/mol and preferably in the range from $10^5$ to $10^7$ g/mol and a crystallinity ($X_c$) in the range from 10% to 99.9%, preferably in the range from 40% to 99% and more preferably in the range from 80% to 99%. Preferred partly crystalline plastics are homopolymers, block or random copolymers and terpolymers of ethylene, propylene, butylene, styrene and/or divinylbenzene, especially polyolefins, such as polyethylene (HDPE, MDPE, LDPE, LLDPE), polypropylene, especially high density polyethylene (HDPE) and also POM (polyoxymethylene).

The partly crystalline plastics may further comprise additives in customary amounts, examples being stabilizers, optical brighteners, fillers and lubricants.

When used for coloration of partly crystalline plastics, the pigment formulation of the present invention is advantageously used in an amount of 0.01% to 5% by weight and preferably 0.05% to 1% by weight, based on the plastics. The coloration step can be carried out according to customary methods, as by extrusion or injection molding for example.

The influence on the warpage propensity of polyolefin by the pigment formulation produced according to the present invention is tested on a ready-produced injection molding in the form of a plaque. After aging, the dimensions of the plaque (length, width) are measured and the degree of warpage or shrinkage is determined according to the following equation:

% warpage=100%×(% warpage vertical−% warpage horizontal)/(% warpage horizontal)

The warpage values are determined at 220° C. and at 280° C.

It was surprising and unforeseeable that the combination of C.I. Pigment Yellow 214 with the copper phthalocyanine pigment C.I. Pigment Blue 15:3 and/or C.I. Pigment Blue 15:1 provides not just low-warpage injection moldings but also colorations having distinctly higher cleannesses compared with mixtures with other yellow pigments. There is no need to produce a mixed crystal to achieve the high cleanness. In addition, the colorations produced with the pigment formulations of the present invention possess high color strengths, good heat stability and light fastnesses. Migration fastness is very good.

The pigment formulations of the present invention can obviously also be used for pigmentation of plastics which do not come within the above-recited term "partly crystalline". They are generally useful for pigmentation of macromolecular organic materials of natural or synthetic origin, for example plastics, resins, coatings, paints, electrophotographic toners and developers, electric materials, color filters and also of inks, including printing inks, and seed.

Macromolecular organic materials which can be pigmented with the pigment formulations of the present invention are for example cellulose compounds, for example cellulose ethers and esters, such as ethylcellulose, nitrocellulose, cellulose acetates or cellulose butyrates, natural binders, for example fatty acids, fatty oils, resins and their conversion products, or manufactured resins, such as polycondensates, polyadducts, addition polymers and addition copolymers, such as for example amino resins, especially urea- and melamine-formaldehyde resins, alkyd resins, acrylic resins, phenoplasts and phenolic resins, such as novolaks or resoles, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, cumarone-indene and hydrocarbon resins, epoxy resins, unsaturated manufactured resins (polyesters, acrylates) having various curing mechanisms, waxes, aldehydic and ketonic resins, rubber, caoutchouc and its derivatives and lattices, casein, silicones and silicone resins; individually or in admixtures.

It is immaterial whether the macromolecular organic compounds mentioned are in the form of plastically deformable compositions, melts or in the form of spinning solutions, dispersions, coatings, paints or printing inks. Depending on the intended use, it will be advantageous to use the pigment formulations of the present invention as a blend or in the form of formulations or dispersions.

Based on the macromolecular organic material to be pigmented, the pigment formulation of the present invention is usually used in an amount of 0.01% to 30% by weight and preferably 0.1% to 15% by weight.

It is also possible in some cases to use a crude having a BET surface area of greater than 2 $m^2/g$ and preferably greater than 5 $m^2/g$ instead of the corresponding ground and/or finished pigment composition of the present invention. This crude can be used for producing color concentrates in liquid or solid form in concentrations from 5% to 99% by weight, alone or if appropriate in a mixture with other crudes or ready-produced pigments.

The pigment formulations of the present invention are also useful as a colorant in electrophotographic toners and developers, for example one- or two-component powder toners (also known as one- or two-component developers), magnetic toners, liquid toners, addition polymerization toners and also specialty toners. Typical toner binders are addition polymerization, polyaddition and polycondensation resins, such as styrene, styrene-acrylate, styrene-butadiene, acrylate, polyester, phenol-epoxy resins, polysulfones, polyurethanes, individually or in combination, and also polyethylene and polypropylene, which may each contain further ingredients, such as charge control agents, waxes or flow assistants, or may subsequently be modified with these additives.

The pigment formulations of the present invention are further useful as a colorant in powders and powder coatings, especially in triboelectrically or electrokinetically sprayable powder coatings used for surface coating of articles composed for example of metal, wood, plastic, glass, ceramic, concrete, textile material, paper or rubber.

Useful powder coating resins typically include epoxy resins, carboxyl- and hydroxyl-containing polyester resins, polyurethane and acrylic resins together with customary hardeners. Combinations of resins can also be used. For instance, epoxy resins are frequently used in combination with carboxyl- and hydroxyl-containing polyester resins. Typical hardener components (depending on the resin system) include for example acid anhydrides, imidazoles and also dicyandiamide and derivatives thereof, blocked isocyanates, bisacylurethanes, phenolic and melamine resins, triglycidyl isocyanurates, oxazolines and dicarboxylic acids.

The pigment formulations of the present invention are also useful as a colorant in ink jet inks on an aqueous and nonaqueous basis and also in such inks as operate by the hot melt process.

Ink jet inks generally contain in total 0.5% to 15% by weight and preferably 1.5% to 8% by weight (reckoned dry) of one or more of the pigment formulations of the present invention.

Microemulsion inks are based on organic solvents, water and if appropriate an additional hydrotropic substance (interfacial mediator). Microemulsion inks contain in general 0.5% to 15% by weight and preferably 1.5% to 8% by weight of one or more of the pigment formulations of the present invention, 5% to 99% by weight of water and 0.5% to 94.5% by weight of organic solvent and/or hydrotropic compound.

Solvent-based ink jet inks contain preferably 0.5% to 15% by weight of one or more of the pigment formulations of the present invention, 85% to 99.5% by weight of organic solvent and/or hydrotropic compounds.

Hot melt inks are usually based on waxes, fatty acids, fatty alcohols or sulfonamides which are solid at room temperature and liquefy on heating, the preferred melting range being between about 60° C. and about 140° C. Hot melt ink jet inks consist for example essentially of 20% to 90% by weight of wax and 1% to 10% by weight of one or more of the pigment formulations of the present invention. They may further include 0% to 20% by weight of an additional polymer (as "dye dissolver"), 0% to 5% by weight of dispersing assistant, 0% to 20% by weight of viscosity modifier, 0% to 20% by weight of plasticizer, 0% to 10% by weight of tackifying additive, 0% to 10% by weight of transparency stabilizer (prevents crystallization of waxes, for example) and also 0% to 2% by weight of an antioxidant.

The pigment formulations of the present invention are further useful as a colorant for color filters, not only for additive but also for subtractive color generation, and also as a colorant for electronic inks ("e-inks") or "electronic paper" ("e-paper"). To produce color filters, not only reflecting but also transparent color filters, pigments are applied in the form of a paste or as a pigmented photoresist in a suitable binder (acrylates, acrylic esters, polyimides, polyvinyl alcohols, epoxides, polyesters, melamines, gelatin, caseins) to the respective LCD components (e.g. TFT-LCD=Thin Film Transistor Liquid Crystal Displays or for example ((S) TN-LCD=(Super) Twisted Nematic-LCD). As well as a high thermal stability, a high pigment purity is a prerequisite for a stable paste or a pigmented photoresist. In addition, the pigmented color filters can also be applied by ink jet printing processes or other suitable printing processes.

In the examples which follow, percentages are by weight, unless otherwise stated. For the pigment formulations used for producing the pigment formulations of the present invention, the pigment and its content are reported; the remaining fractions consist of a mixture of commercially available polyethylene and polyethylene wax.

EXAMPLE 1

16.4 parts of a pigment formulation comprising 38% of C.I. Pigment Yellow 214 are coextruded with 24.5 parts of a pigment formulation comprising 30% of copper phthalocyanine pigment C.I. Pigment Blue 15:3, with 12.3 parts of a pigment formulation comprising 70% of titanium dioxide pigment C.I. Pigment White 6 and with 47.6 parts of LDPE to obtain 100 parts of pigment formulation which is in accordance with the present invention and comprises 17.6 parts of titanium dioxide pigment C.I. Pigment White 6, 6.2 parts of C.I. Pigment Yellow 214 and 7.4 parts of copper phthalocyanine pigment C.I. Pigment Blue 15:3.

Examples 2, 3 and 4 are comparative examples and were made similarly to Example 1, by coextrusion, except that the C.I. Pigment Yellow 214 formulation was replaced by the same amount of another yellow pigment formulation. These four pigment formulations are used for coloring polyethylene.

TABLE 1

| Example | Yellow pigment | Chroma | Warpage at 220° C. | Heat stability |
| --- | --- | --- | --- | --- |
| 1 | C.I. P.Y. 214 | 54.7 | <=15% | >270° C. |
| 2 (comp.) | C.I. P.Y. 138 | 52.5 | >30%, distinctly worse | >270° C., comparable |
| 3 (comp.) | C.I. P.Y. 180 | 45.4 | <=15%, comparable | >270° C., comparable |
| 4 (comp.) | C.I. P.Y. 194 | 50.6 | <=15%, comparable | <240° C., distinctly worse |

The pigment formulation of Example 3 exhibits comparable warpage behavior and comparable heat stability, but it only produces colorations having a distinctly lower chroma, i.e., having an unacceptable cleanness. The pigment formulation of Example 2 exhibits distinctly worse warpage behavior as well as lower cleanness, and the pigment formulation of Example 4 exhibits distinctly worse heat stability as well as lower cleanness.

What is claimed is:

1. A pigment formulation comprising C.I. Pigment Yellow 214 and at least one copper phthalocyanine pigment selected from the group consisting of C.I. Pigment Blue 15:3, C.I. Pigment Blue 15:1 and a mixture thereof, the ratio of C.I. Pigment Yellow 214 to the at least one copper phthalocyanine pigment being in the range from 1:20 to 20:1.

2. The pigment formulation according to claim 1 wherein the ratio of C.I. Pigment Yellow 214 to the at least one copper phthalocyanine pigment is in the range from 1:10 to 10:1.

3. The pigment formulation according to claim 1 comprising 1% to 40% by weight of C.I. Pigment Yellow 214 and 1% to 40% by weight of the at least one copper phthalocyanine pigment.

4. The pigment formulation according to claim 1 comprising
 a) 1% to 40% by weight of C.I. Pigment Yellow 214,
 b) 1% to 40% by weight of the at least one copper phthalocyanine pigment,
 c) 20% to 98% by weight of at least one polyolefin, d) 0% to 40% by weight of at least one additive selected from the group consisting of UV absorbers, antioxidants, ontical brighteners, fillers, antistats, lubricants and dispersing assistants, e) 0% to 25% by weight of one or more white pigments, wherein the weight percentages of components a) to e) are based on the total weight of the pigment formulation (100% by weight), and also f) 0% to 40% by weight, based on the sum of the weight percentages of the components a) and b), of one or more shading colorants.

5. The pigment formulation according to claim 1 comprising a) 2.5% to 40% by weight of C.I. Pigment Yellow 214, b) 2.5% to 40% by weight of the at least one copper phthalocyanlne pigment, c) 20% to 95% by weight of at least one polyolefin, d) 0% to 40% by weight of at least one additive selected from the group consisting of UV absorbers, antioxidants, optical brighteners, fillers, antistats, lubricants and dispersing assistants, e) 0% to 25% by weight of one or more white pigments, wherein the weight percentages to components a) to e) being based on the total weight of the pigment formulation (100% by weight), and also f) 0% to 40% by weight, based on the sum of the weight percentages of the components a) and b), of one or more shading colorants.

6. The pigment formulation according to claim 1 wherein the ratio of C.I. Pigment Yellow 214 to the at least one copper phthalocyanine pigment is in the range from 1:5 to 5:1.

7. The pigment formulation according to claim 1 comprising a) 2.5% to 40% by weight of C.I. Pigment Yellow 214, b) 2.5% to 40% by weight of the at least one copper phthalocyanine pigment, c) 20% to 95% by weight of at least one polyolefin, d) 1% to 25% by weight of at least one additive selected from the group consisting of UV absorbers, antioxidants. optical brighteners, fillers, antistats, lubricants and dispersing assistants, e) 1% to 20% by weight of one or more white pigments, wherein the weight percentages of components a) to e) being based on the total weight of the pigment formulation (100% by weight), and also f) 1% to 20% by weight, based on the sum of the weight percentages of the components a) and b), of one or more shading colorants.

8. A process for producing a pigment formulation according to claim 4, comprising the step of incorporating the pigments a) and b) and, optionally, the components d), e) and f) homogeneously into the component c) either separately, as a dry mixture or as a mixture of two pigment formulations.

9. A macromolecular organic material of natural or synthetic origin pigmented with a pigment formulation according to claim 1, wherein the macromolecular organic material of natural or synthetic origin is selected from the group consisting of plastics, resins, coatings, paints, electrophotographic toners, electrophotographic developers, electronic inks and electronic papers, color filters, inks, printing inks, and seed.

10. A pigmented partly crystalline plastic pigmented with the pigment formulation according to claim 1.

11. The pigmented partly crystalline plastic as claimed in claim 10, wherein the pigmented partly crystalline plastic is at least one polyolefin.

12. The pigmented partly crystalline plastic as claimed in claim 10, wherein the pigmented partly crystalline plastic is a polyethylene.

* * * * *